March 6, 1951     F. T. SARGENT     2,544,185

TRAILER HITCH

Filed May 18, 1948

INVENTOR.
FRANK T. SARGENT
BY

Patented Mar. 6, 1951

2,544,185

UNITED STATES PATENT OFFICE 2,544,185

TRAILER HITCH

Frank T. Sargent, Clio, Mich.

Application May 18, 1948, Serial No. 27,744

4 Claims. (Cl. 280—33.44)

This invention relates to vehicle couplings in general, and relates more particularly to a trailer hitch for motor cars.

Trailer hitches for motor cars have been the subject of much general design and the subject of numerous patents. Hitches of this type have not been desirable for several reasons. Generally, to be safe and useful, the trailer hitch must be rugged. But rugged design and the pleasing lines of our present-day motor cars are not compatible. The hitches of rugged design are not pleasant in aesthetic values, and hitches of pleasant design have been weak and unsafe. There has even been a hitch patented recently which is adapted to be mounted in the rear trunk of a car and may be extended therefrom to pull a trailer. Of course, a hitch in such a place will interfere with the free use of the trunk and is, therefore, generally not desirable.

Therefore, an object of this invention is to provide a trailer hitch of rugged and strong construction, which trailer hitch may be carried in a hidden position until extended for use.

Another object of this invention is to provide a trailer hitch secured directly to the strongest part of the motor car and having only the active hitch portion extending in view.

Yet another object of this invention is to provide a trailer hitch which may be permanently mounted on the undercarriage framework of a car, and having a hitch bar which may be retracted from view when not in use, and may be extended beyond the car to hitch a trailer to the car.

Still another object of this invention is to provide a disappearing type trailer hitch requiring very little effort to position the hitch for active use or to retract the trailer hitch to a carrying position, but having ample strength to pull a maximum load with full safety.

Other objects and a fuller understanding of the invention may be had by referring to the following description and claims, taken in conjunction with the accompanying drawing, in which:

Figure 1:
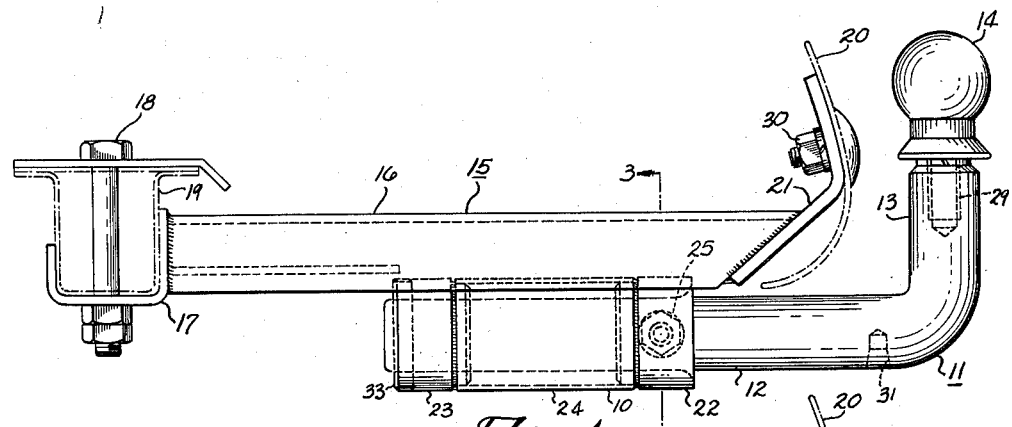
Figure 1 is a side elevational view of one embodiment of this invention illustrated with the cooperating portions of a motor car indicated in phantom lines.

Although a trailer hitch made in accordance with the principles of this invention may be accomplished in more than one design, the figures of the drawings illustrate the embodiment which has been found to be preferred for several reasons. In the drawing the reference character 10 indicates a sleeve and the reference character 11 indicates a hitch bar. A bracket 15 is securely mounted into the car and the sleeve 10 is welded or otherwise suitably secured to the bracket 15 and the hitch bar 11 operates into position within the sleeve 10.

More specifically, the preferred bracket 15 comprises a channel member 16, or other suitable structural shape having ample strength to pull a loaded trailer. In the Figure 3, the cross-sectional form of the channel 16 may be seen, and this form has been selected because of the structural strength inherent in such a structural design and because of the use in attaching the sleeve 10 to the channel form. The channel 16 is provided at one end with a channel member 17 positioned at right angles to the longitudinal direction of the channel 16, and is provided at the other end with an angle bracket 21. The channel 17 and the angle bracket 21 may be secured in any suitable manner, but undoubtedly the preferred method will be welding as indicated. With the structure of the bracket 15 as described, the channel portion 17 may be slipped over a frame member 19 extending laterally across the rear portion of the car and securely held in the position indicated by bolt-and-nut assembly 18. It is to be understood, of course, that the size and shape of the channel 17 may be varied in accordance with the structural members of the car with which the trailer hitch is to be used. The angle bracket 21 is adapted to fit against the inner surface of the rear bumper 20 of the car and is securely attached thereto by means of bolt-and-nut assembly 30. Thus, the bracket 15 is securely anchored in a longitudinal direction with respect to the direction of travel of the car and is supported securely at both ends. As is well known, rented trailers are normally clamped onto the bumper 20 only, and the bumper 20 generally has sufficient strength to pull the trailer in this manner, but damage results to the finish of the bumper and very often the bumper will be bent and damaged when the trailer is heavily loaded. However, with the bracket 15 securely clamped to both the frame member 19 and to the bumper 20, the bracket 15 is doubly supported by the two members, both of which are sufficiently strong in themselves to carry the load placed upon the bracket 15.

The sleeve 10 is illustrated as comprising a front bushing 23 and a rear bushing 22 with a relatively thin-walled tubular member 24 extending between the bushings 22 and 23. This construction is provided for the purpose of reducing the manufacturing costs of the sleeve 10 by reducing the large amount of boring which would normally be required to provide the longitudinal bore opening through the sleeve 10. In the manner illustrated, the bushing is readily fabricated and provides two separated bearing areas to support the hitch bar 11. As best illustrated in the Figure 3, the bushings 22 and 23 are welded to the channel 16, and the tubular portion 24 may be welded to the channel 16 if desired. In any event, the sleeve 10 comprises a member having a longitudinal opening therethrough extending in a longitudinal direction relative to the direction of travel of the motor car onto which it is placed, and the sleeve 10 has at least two separated bearing areas to support the hitch bar 11.

The hitch bar 11 comprises an attachment portion 12 having a cross-sectional area of substantially the same size and shape as the internal dimension of the longitudinal bore through the sleeve 10. Thus the attachment portion 12 will be securely supported in any selected position by the bushings 22 and 23. The hitch bar 11 also includes a hitch portion 13, which in the embodiment illustrated is a short section extending substantially perpendicular to the attachment portion 12. A ball hitch 14 is readily attached to the end of the hitch portion 13 by means of a screw stud 29. The ball hitch 14 is of conventional design and may be employed with conventional ball receiving trailer coupling.

Figure 2:
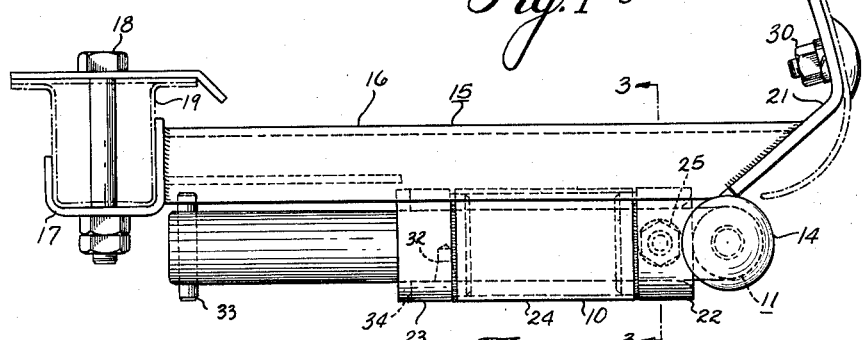
Figure 2 is a view similar to Figure 1 with the hitch bar retracted to an out-of-the-way carrying position.
Figure 3:
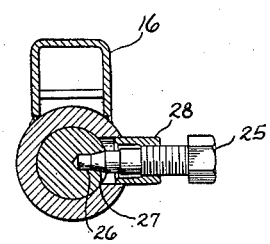
Figure 3 is a sectional view along the line 3—3 of Figure 2.
Figure 4:
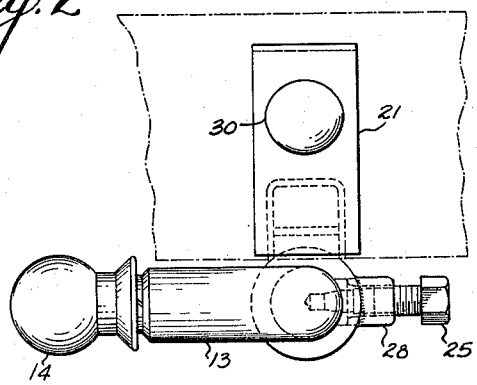
Figure 4 is an end view of Figure 2.

The operation of this trailer hitch has been made very simple and yet positive in its action by the provision of the positive locking means illustrated best in the Figure 3. This positive locking means includes a nut 28 welded or otherwise suitably attached to the side of the bushing 22. A lock bolt 25 is provided with a lead end 26 and a taper portion 27. As may be best seen in the Figures 1 and 2, the attachment portion 12 of the hitch bar 11 is provided with tapered openings 31 and 32 which are adapted to closely receive the tapered portion 27 of the bolt 25. In the Figures 1 and 2 it will be seen that the openings 31 and 32 are spaced from one another and the longitudinal axes of the two openings 31 and 32 extend at right angles to one another. Thus, as illustrated in the Figures 1 and 3, the hitch bar 11 is extended into position to draw a trailer, and in that position the lock bolt 25 extends into the opening 32. However, in the Figure 2 of the drawing the hitch bar 11 is in a retracted position out of sight below the car, and in this position the lock bolt 25 extends into the opening 31. The taper 27 of the bolt 25 and the similar tapers in the openings 31 and 32 are of the self-locking or wedge type and, therefore, once the bolt 25 is turned tight in order to force the taper 27 tightly into either of the openings, no lock washers or other lock mechanism are needed in order to hold the bolt 25 against unintentional rotation to release the hitch bar 11 from its selected position.

The attachment portion 12 is also provided with a pin 33 at the end thereof and the bushing 23 is provided with notches 34 adapted to receive the portion of the pin 33 extending beyond the surface of the attachment portion 12. Thus, the pin 33 serves the double function of properly aligning the hitch portion 13 in a perfectly vertical position when extended for use, and also providing interlocking surfaces between the hitch bar 11 and the sleeve 10 to transfer pulling load from the hitch bar 11 to the sleeve 10 and hence to the bracket 15 and the framework of the car. The spacing of the pin 33 should be quite accurate in order that the pin 33 will be pulled tightly into the notches 34 when the bolt 25 is tightened into the opening 32. If thus properly constructed, the shearing strength of both the bolt 25 and the pin 23 will be effective in holding the hitch bar 11 in the sleeve 10.

The operation of this trailer hitch is extremely simple and yet the hitch is carried completely out of sight when retracted and not in use, and presents a simple and neat appearance when extended beyond the car to pull a trailer. Furthermore, the bracket 15 and the sleeve 10, as well as the hitch bar 11 itself, may be made in large proportions in order to insure rugged, lasting and safe service, but the bulky appearance will be completely hidden from view.

In operation the hitch bar 11 is carried beneath the car forward of the rear bumper 20 completely out of sight when not in use. The hitch bar is held in that position, as illustrated in Figure 2, by tightening the bolt 25 into the opening 31 on the hitch bar 11. Whenever it is desired to extend the hitch bar 11 to pull a trailer, a wrench of suitable size is placed upon the head of the bolt 25 and the bolt 25 is withdrawn from the opening 31. The hitch bar 11 is then pulled rearwardly of the car and twisted through a 90° rotation until the pin 33 engages the notches 34. The hitch bar 11 is then pulled rearwardly to pull the pin 33 into the notches 34. Thereafter, the bolt 25 is again turned to cause the end 26 and the taper 27 to extend into the opening 32 on the hitch bar 11 and the bolt 25 is drawn tight to wedge the cooperating tapered surfaces. No further operation is necessary to place the hitch in condition for active use.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A retractable trailer hitch for a motor car having a rear bumper comprising, a longitudinal bracket adapted to be attached at one end to the framework of the car and at the other end to the bumper, a sleeve having a longitudinal opening therethrough, means to mount said sleeve on said bracket with the opening thereof extending in a direction adapted to be in the longitudinal direction of the car, and L-shaped hitch bar having an attachment leg and a hitch leg, said attachment leg being receivable in said opening of the sleeve in a first position with the hitch leg retracted relative to the sleeve and thereby being adapted to be stored beneath the car forward of the bumper, and being receivable in said opening of the sleeve in a second position with the hitch leg extended relative to the sleeve and thereby being adapted to extend rearwardly of the bumper, and positive engagement clamp means to secure said attachment leg in the said first position during storage periods, and to secure the attachment leg in the extended position for attaching a trailer thereto.

2. A trailer hitch for motor vehicles comprising, a sleeve having a cylindrical opening therethrough, means to mount said sleeve on the motor vehicle out of sight under the vehicle forward of the rear bumper of the vehicle, a hitch bar having an attachment portion and a hitch portion, at least said attachment portion having a circular cross-sectional form adapted to fit complementarily into the said cylindrical opening of the sleeve, said attachment portion having two longitudinally spaced socket recesses, each said socket recess having a longitudinal axis, said two socket recesses being offset to extend at an angle with respect to one another, and lock bolt means carried by said sleeve.

3. A retractable trailer hitch for a motor car having a rear bumper comprising, a longitudinal bracket adapted to be attached at one end to the framework of the car and at the other end to the bumper, a sleeve having a longitudinal opening therethrough, means to mount said sleeve on said bracket with the opening thereof extending in a direction adapted to be in the longitudinal direction of the car, a hitch bar having an attachment portion and a hitch portion, said attachment portion being receivable in said opening of the sleeve in a first position with the hitch portion retracted relative to the sleeve and thereby being adapted to be stored beneath the car forward of the bumper, and being receivable in said opening of the sleeve in a second position with the hitch portion extended relative to the sleeve and thereby being adapted to extend rearwardly of the bumper, positive engagement clamp means including screw means threadably carried by said sleeve, and engagement surface means on said attachment portion adapted to be engaged by said screw means, whereby said hitch bar may be pressed against the sleeve to prevent rattle and may be positively engaged to prevent rotational and longitudinal movement.

4. A retractable trailer hitch for a motor car having a rear bumper comprising, a longitudinal bracket adapted to be attached at one end to the framework of the car and at the other end to the bumper, mounting means carried by said longitudinal bracket, said mounting means having two longitudinally spaced bearing surfaces aligned to define a longitudinal opening extending in a direction adapted to be in the longitudinal direction of the car, a hitch bar having an attachment portion and a hitch portion, said attachment portion being receivable in said mounting means in a first position with the hitch portion retracted relative to the mounting means and thereby being adapted to be stored beneath the car forward of the bumper, and being receivable in said mounting means in a second position with the hitch portion extended relative to the mounting means and thereby being adapted to extend rearwardly of the bumper, and positive engagement clamp means including screw means threadably carried by said mounting means and including engagement surface means on said attachment portion adapted to be engaged by said screw means, whereby said hitch bar may be pressed against the spaced bearing surfaces to prevent rattle and may be positively engaged to prevent rotational and longitudinal movement.

FRANK T. SARGENT.

REFERENCES CITED

The following references are of record in the file of this patent:

UNITED STATES PATENTS

| Number | Name | Date |
| --- | --- | --- |
| 2,309,850 | Klawitter | Feb. 2, 1943 |
| 2,412,672 | Calhoun | Dec. 17, 1946 |
| 2,425,838 | Schultz | Aug. 19, 1947 |